Oct. 6, 1931.  M. P. RUMNEY  1,826,575
SHOCK ABSORBER
Filed Nov. 1, 1928  3 Sheets-Sheet 2
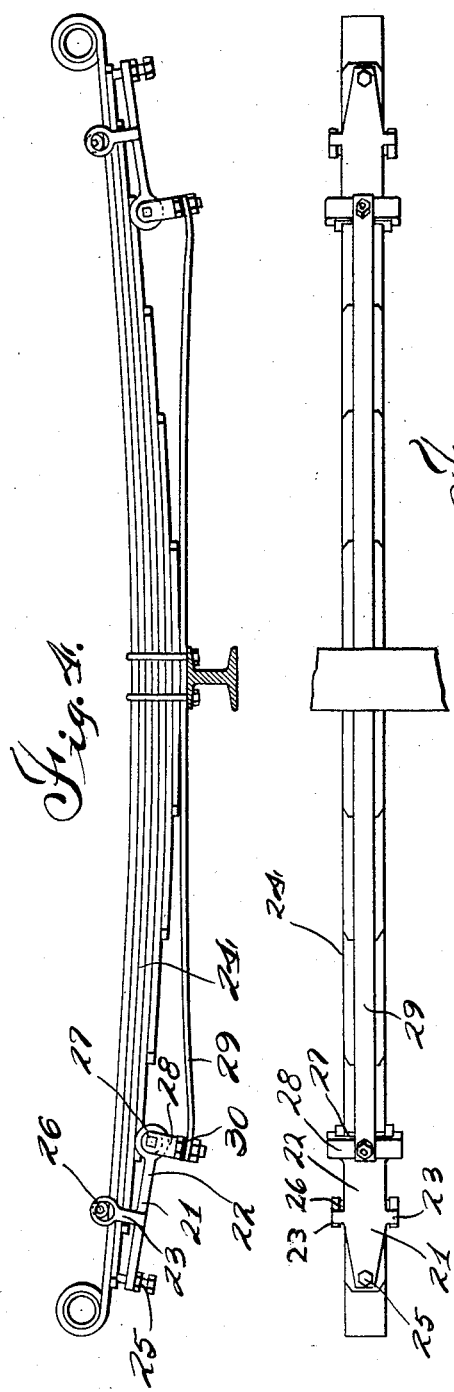
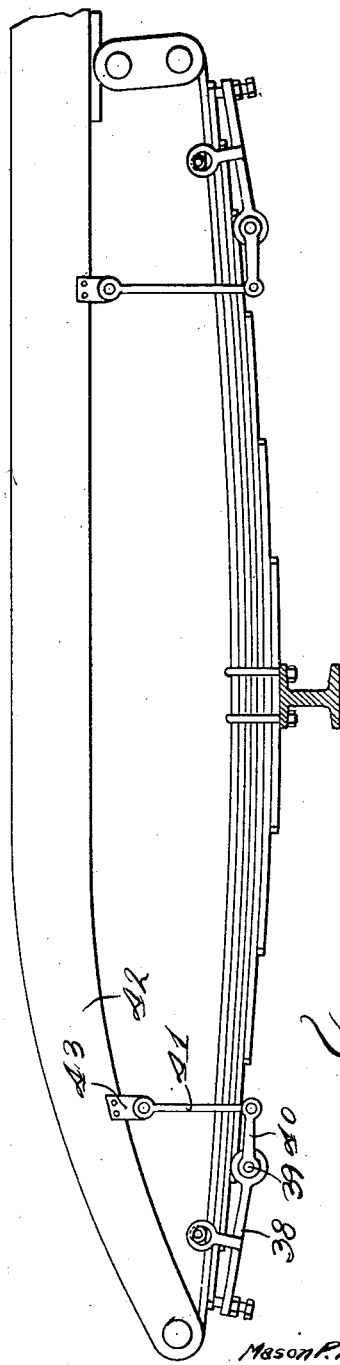
INVENTOR
Mason P. Rumney
BY
Whittemore Hulbert Whittemore Belknap
ATTORNEYS Oct. 6, 1931.  M. P. RUMNEY  1,826,575
SHOCK ABSORBER
Filed Nov. 1, 1928   3 Sheets-Sheet 3
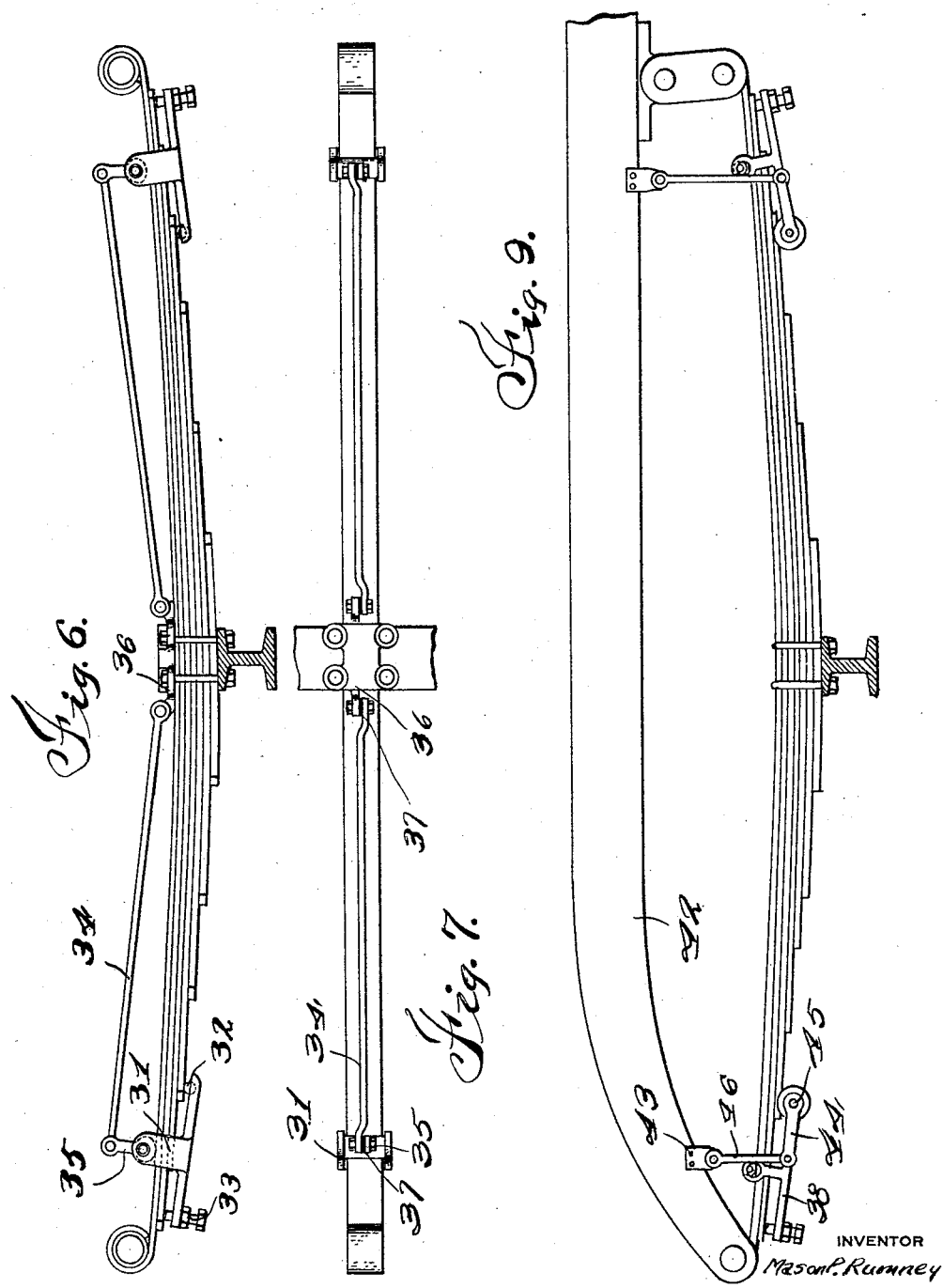

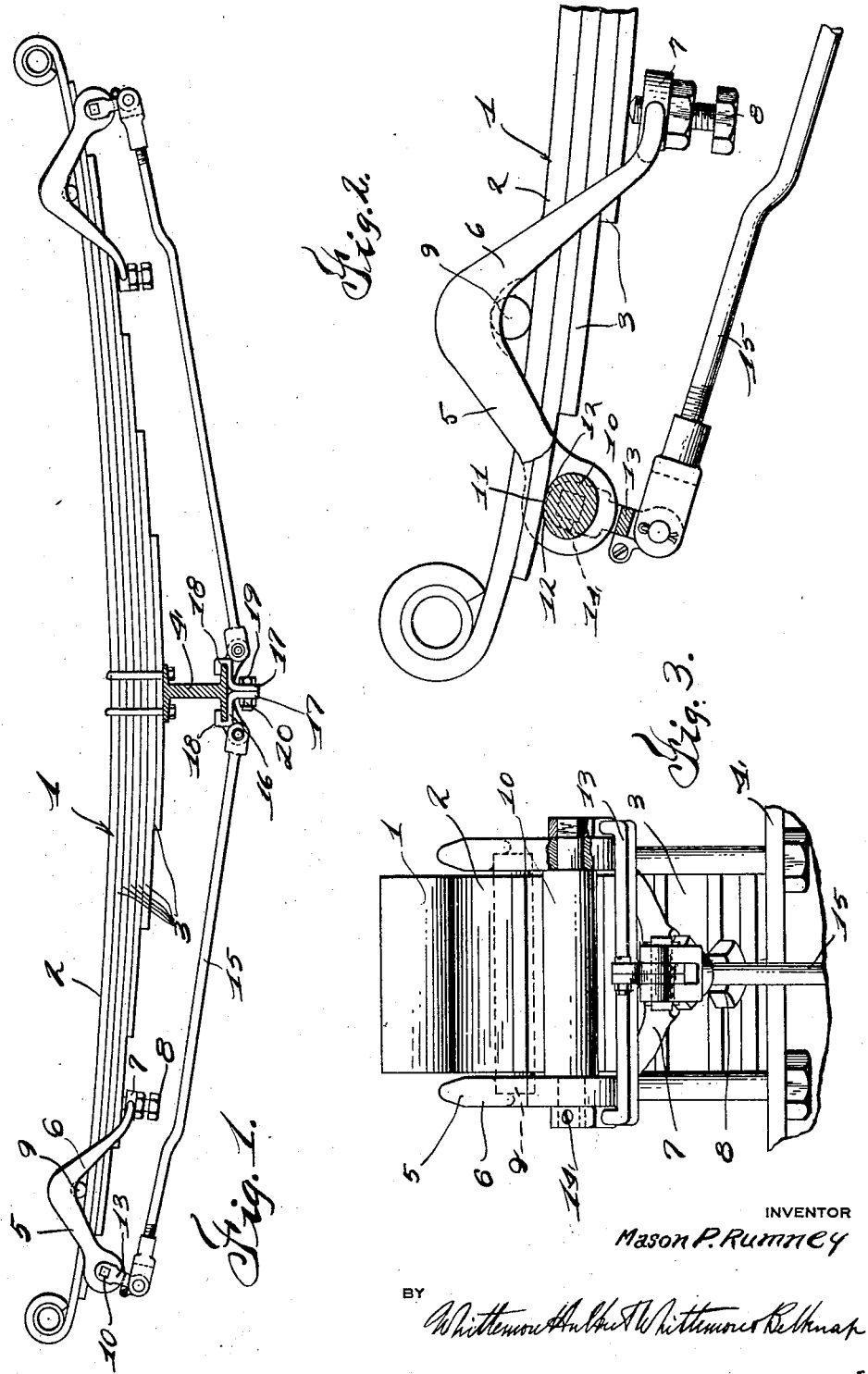

Patented Oct. 6, 1931

1,826,575

UNITED STATES PATENT OFFICE

MASON P. RUMNEY, OF DETROIT, MICHIGAN, ASSIGNOR TO DETROIT STEEL PRODUCTS COMPANY, OF DETROIT, MICHIGAN, A CORPORATION OF MICHIGAN

SHOCK ABSORBER

Application filed November 1, 1928. Serial No. 316,465.

The invention relates to shock absorbers and is particularly applicable to shock absorbers for vehicle leaf springs. One of the objects of the invention is to provide a shock absorber which will not affect the operation of the spring to which it is applied during the movement of the vehicle over a fairly smooth road, but will automatically increase the resistance to flexure of the spring during the movement of the vehicle over a rough road. Another object is to provide a simple construction of shock absorber which may be readily applied. Further objects of the invention reside in the novel features of construction and combination and arrangements of parts as more fully hereinafter set forth.

In the drawings:—

Figure 1 is a side elevation of a shock absorber, embodying my invention, and showing the same applied to a vehicle leaf spring;

Figure 2 is an end view thereof;

Figure 3 is a cross section on the line 3—3 of Figure 2;

Figure 4 is a view similar to Figure 1 showing a modification;

Figure 5 is a bottom plan view thereof;

Figure 6 is a view similar to Figure 1, showing another modification;

Figure 7 is a top plan view thereof;

Figures 8 and 9 are views similar to Figure 1, showing further modifications.

While the shock absorber embodying my invention is applicable to different types of leaf springs, it is shown in the present instance as applied to a semi-elliptic spring of a motor vehicle. This spring is represented by the reference character 1 and is formed in the usual manner of the main spring leaf 2 and the complemental spring leaves 3. This spring extends transversely of and is rigidly secured intermediate its ends to the axle 4.

I preferably provide a shock absorbing device at each end of the spring and since these devices are similar, but one will be described. 5 is the frame of the device having V-shaped arms 6 at the inner and outer sides of the spring and connected together at their inner ends by the bar 7, which is preferably integral with the arms. This frame carries contact bearings for engaging one side of the spring at longitudinally spaced points and an intermediate contact bearing for engaging the opposite side of the spring at a longitudinally intermediate point. One of the contact bearings is a set screw 8, which is threaded through the bar 7 and is adapted to abut one of the spring leaves. Another contact bearing is the roll 9 which extends between the arms 6 at their apices and is adapted to abut another spring leaf. The other contact bearing for abutting a spring leaf at the same side of the spring as the set screw 8 is the cam 10, which is journaled in the outer ends of the arms 6 and extends therebetween. In the present instance the set screw 8 and the cam 10 are shown abutting a convex side of the spring and different complemental spring leaves 3 with the roll 9 abutting the concave side of the spring and the main spring leaf 2. The set screw can be tightened down to clamp the spring leaves between the contact bearings with a predetermined pressure and the end of the set screw is preferably made to indent the spring leaf which it engages to hold the shock absorbing device from longitudinal movement relative to this spring leaf.

The cam 10 is formed with the arcuate portion 11 which is concentric with the axis of rotation of the cam and with the cam portions 12 on opposite sides of and adjacent to the arcuate portion 11. For rotating the cam upon flexure of the spring, I have provided the lever 13 which, as shown, is bifurcated with the outer ends of its bifurcations fixedly secured to the ends of the cam as by means of the set screws 14. The lower end of this lever is pivotally connected to the outer end of the actuating rod 15, the inner end of the actuating rod being pivotally connected to the clamp 16 upon the axle 4.

For facilitating the application of both devices and their cam actuating mechanism, clamp 16 is formed of the cooperating clamp sections 17, which have hooks 18 at their upper ends for engaging over the lower flange of the axle 4, this axle in the present instance being an I-beam. These clamping sections are secured together at their lower ends by means of the bolt 19 and the nut 20.

The cam 10 occupies a position such that its arcuate portion 11 is in contact with the spring during ordinary flexure of the spring while the motor vehicle is traveling over a fairly smooth road so that the shock absorbing device has no appreciable effect upon the spring at this time. However, upon flexure of the spring beyond the ordinary or normal flexure when the motor vehicle is traveling over a rough road the flexing of the spring in either direction causes rotation of the cam through the actuating rod 15 to bring one of the cam portions 12 of the cam into engagement with the spring, thereby more tightly clamping the portion of the spring embraced between the contact bearings of the device and increasing the frictional resistance to relative movement of the spring leaves to absorb the shock. In addition, the arrangement of the device itself is such that downward movement of the end of the spring relative to its point of connection to the axle causes increased pressure between the spring leaves.

In the modification shown in Figures 4 and 5, the shock absorbing device has its frame 21 formed of the sheet metal plate 22 and the arms 23 extending integral from the side edges of the plate intermediate its ends. As shown, the plate is below the spring 24 and the arms extend upwardly adjacent to the inner and outer sides of this spring. 25 is a contact bearing in the nature of a set screw threadedly engaging one end of the plate 22 and abutting the lower or convex side of the spring. 26 is a second contact bearing in the nature of a roll engaging the upper or concave side of the spring and extending between the arms 23. 27 is a third contact bearing at the opposite end of the plate and in the nature of a cam for engaging the lower or convex side of the spring. This third contact bearing is formed in the same manner as the contact bearing 10 and is secured to the yoke 28 which depends therefrom. The lower portion of this yoke is connected to an outer end of the auxiliary spring leaf 29, the middle of which is rigidly secured between the spring and the axle. To provide for swivel action and at the same time eliminate noise, there is the resilient block 30 preferably formed of rubber clamped between the lower end of the lever and the auxiliary spring leaf. This shock absorber operates in substantially the same manner as that shown in Figures 1, 2 and 3 with a possible exception that the auxiliary spring leaf may flex slightly upon flexing of the vehicle spring so that the rotation of the cam may not be quite so pronounced.

In the modification shown in Figures 6 and 7, the frame of the shock absorbing device is formed in the same manner as that of the shock absorbing device 21. However, instead of the cam being located below the spring and at one end of the plate, this cam is journaled in the arms 31 and contacts with the upper or concave side of the spring, the contact bearings at the lower or convex side of the spring being the roll 32 at one end of the plate and the set screw 33 at the other end. The cam is actuated by means of the rod 34 which at one end is pivotally connected to the lever 35 secured to the cam and at the other end to the bracket 36 clamped to the middle of the spring. Resilient blocks 37 preferably formed of rubber are provided between the rod and the lever and bracket.

In the modification shown in Figure 8, the construction of the shock absorbing device 38 is the same as that shown in Figures 4 and 5, but the cam 39 is actuated from the vehicle frame. More particularly, this cam has secured thereto at one end the lever 40, the free end of which is pivotally connected to the rod 41. 42 is a side sill of the motor vehicle frame having secured thereto the bracket 43 which is pivotally connected to the rod 41. In operation, this shock absorbing device functions in the same manner as that shown in Figures 1, 2 and 3.

Figure 9 discloses a modification of Figure 8 in which the lever 44 fixedly secured to one end of the cam 45 extends from this cam in a direction such that upon flexing of the spring the cam is automatically turned by means of the rod 46 connected to the motor vehicle side sill in the direction taken by the complemental spring leaf. As shown, this lever extends away from the middle of the spring. As a result of this construction, the friction between the cam and the spring leaf is minimized.

What I claim as my invention is:

1. The combination with a vehicle leaf spring, of a shock absorber therefor having contact bearing means for engaging one side of said spring at longitudinally spaced points, contact bearing means for engaging the opposite side of said spring at a longitudinally intermediate point, one of said contact bearing means including a cam having an arcuate portion concentric with the axis of rotation of said cam for engaging said spring during its normal flexure and also having an adjacent cam portion for engaging said spring upon flexure thereof beyond normal, and means for rotating said cam upon flexure of said spring.

2. The combination with a vehicle leaf spring and an axle intermediate the ends thereof, of shock absorbing means for said spring comprising devices near the ends thereof, each device having contact bearing means for engaging one side of said spring at longitudinally spaced points, and contact bearing means for engaging the opposite side of said spring at a longitudinally intermediate point, one of said contact bearing means including a cam, rods connected at their outer ends to the cams of both devices, and a clamp upon said axle and connected to the inner ends of said rods.

3. The combination with a vehicle leaf spring, of a shock absorber therefor having contact bearing means for engaging one side of said spring at longitudinally spaced points, contact bearing means for engaging the opposite side of said spring at a longitudinally intermediate point, one of said contact bearing means including a cam, and means for rotating said cam to increase the friction between the spring leaves upon flexure of said spring, said means including a member having a portion stationary with respect to said spring, a lever secured to said cam and member, and resilient means clamped between said lever and member.

4. The combination with a vehicle leaf spring, of a shock absorber therefor having contact bearing means for engaging opposite sides of said spring, one of said contact bearing means including a cam having an arcuate portion concentric with the axis of rotation of said cam for engaging said spring during its normal flexure and also having a cam portion for engaging said spring upon flexure thereof beyond normal, and means including a member having a portion stationary with respect to said spring and a lever secured to said cam and member for rotating said cam upon flexure of said spring.

In testimony whereof I affix my signature.

MASON P. RUMNEY.